United States Patent [19]
Rhudy et al.

[11] 3,888,309
[45] June 10, 1975

[54] POLYMER WATERFLOODING BY CONTROLLING WATER HARDNESS

[75] Inventors: John S. Rhudy; William B. Gogarty, both of Littleton, Colo.

[73] Assignee: Marathon Oil Company, Findlay, Ohio

[22] Filed: Aug. 17, 1973

[21] Appl. No.: 389,082

[52] U.S. Cl.................................. 166/274; 166/275
[51] Int. Cl............................................ E21b 43/22
[58] Field of Search ........... 166/275, 274, 273, 305, 166/294, 295, 270, 300; 252/8.55 D

[56] References Cited
UNITED STATES PATENTS

| | | |
|---|---|---|
| 3,692,113 | 9/1972 | Norton et al. ...................... 166/275 |
| 3,749,172 | 7/1973 | Hessert et al. .................. 166/275 X |
| 3,757,863 | 9/1973 | Clampitt et al. ................ 166/270 X |
| 3,760,879 | 9/1973 | Norton et al. ...................... 166/275 |
| 3,762,476 | 10/1973 | Gall ................................ 166/270 X |
| 3,766,983 | 10/1973 | Chiu .............................. 166/270 X |

*Primary Examiner*—Stephen J. Novosad
*Attorney, Agent, or Firm*—Joseph C. Herring; Richard C. Willson, Jr.; Jack L. Hummel

[57] ABSTRACT

Improved mobility control with salt-sensitive polymers having an average molecular weight large enough to effect a substantial reduction in permeability of the formation rock, is obtained by increasing the total hardness of the polymer solution to effect a reduction in the physical size of the polymer molecules. This process effects less permeability reduction of the formation rock, permits higher injection rates and results in a more economical recovery process. Optimum level of total hardness is dependent upon the average pore size of the formation rock, the sensitivity of the polymer to salt, desired permeability reduction, etc. Total hardness is increased by incorporating salts of $Ca^{++}$ and/or $Mg^{++}$. A miscible or miscible-like flooding agent may precede the polymer solution injection.

12 Claims, 1 Drawing Figure

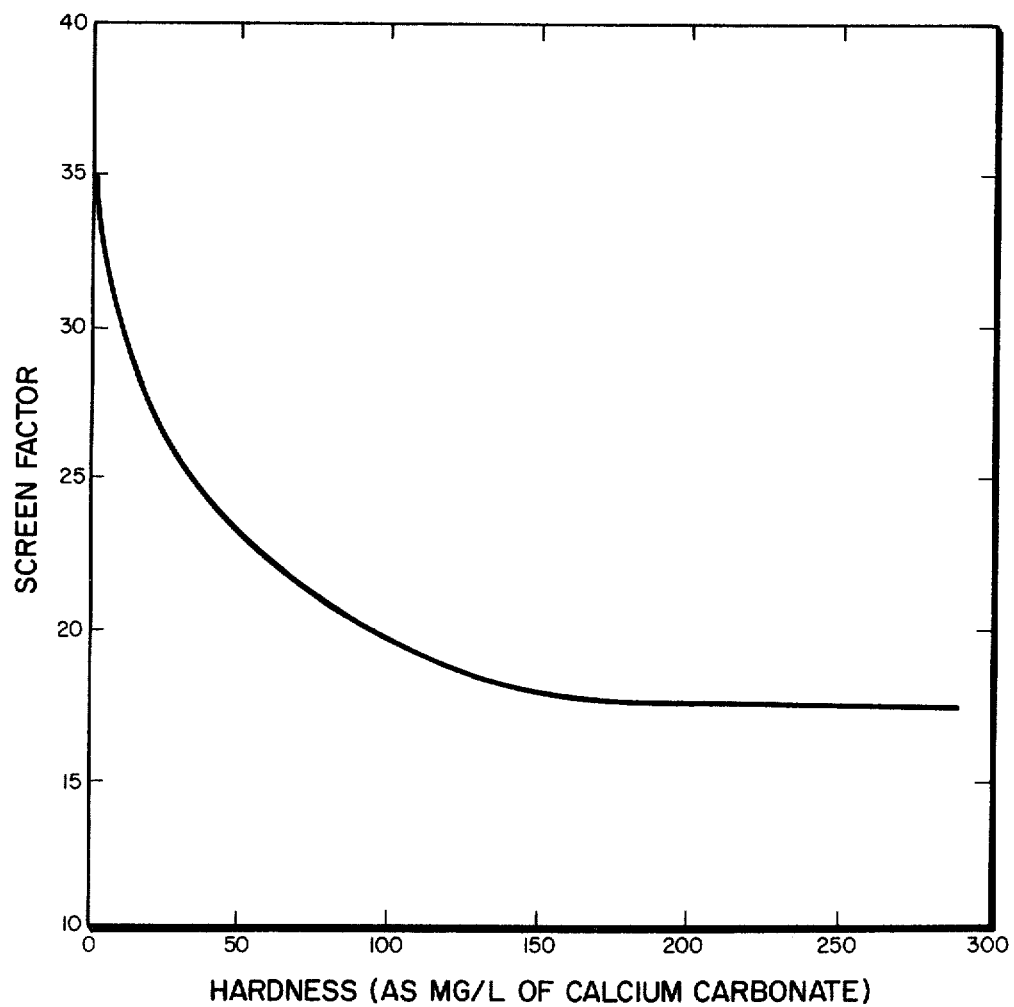

POLYMER WATERFLOODING BY CONTROLLING WATER HARDNESS

BACKGROUND OF THE INVENTION

1. Field of the Invention

This invention relates to injecting through an injection well an aqueous polymer solution into a hydrocarbon-bearing subterranean formation and displacing it toward a production well to recover hydrocarbon therethrough.

2. Description of the Prior Art

Secondary and tertiary recovery processes increase the productivity of hydrocarbon-bearing subterranean formations. Mobility reducing agents are especially useful in waterflooding to obtain better mobility control and, as a result, improved production. Examples of mobility control processes are taught in U.S. Pat. Nos. 2,721,414 to Binder, Jr. et al.; 2,771,136 to Beeson; 2,827,964 to Sandiford; 2,843,545 to Wolfe; 3,002,960 to Kolodny; 3,039,529 to McKennon; 3,067,161 to Roth; 3,282,337 to Pye; 3,370,647 to Wolgemuth; 3,406,754 to Gogarty, and 3,467,187 to Gogarty et al. It is generally known that high molecular weight, water soluble polymers are useful for this purpose. Examples of such polymers include partially hydrolyzed, high molecular weight polyacrylamide, biopolymers, e.g., polysaccharides, etc.

The effectiveness of mobility control agents is dependent upon the extent to which they effect permeability reduction of the reservoir and/or increase the viscosity of the polymer solution. Certain polymers, e.g., partially hydrolyzed, high molecular weight polyacrylamide, are effective and economical for this purpose; but, they can reduce the permeability to such a degree that injection rates and productivity are adversely affected. Also, these polymers are usually too salt-sensitive, i.e., larger salt concentrations adversely influence the mobility imparting properties.

Applicants have discovered a process whereby salt-sensitive polymers may be incorporated into a waterflood under conditions which would ordinarily not permit their use.

SUMMARY OF THE INVENTION

Applicants have observed that the physical size of salt-sensitive polymer molecules may be controlled by varying the total hardness of the water within the aqueous polymer solution and that permeability reduction of the polymer can be controlled using this observation. The optimum level of total hardness in the water is dependent upon the average pore size of the formation rock, the degree of salt sensitivity of the polymer, the desired permeability reduction, etc. By increasing the level of total hardness, the average size of the polymer molecules is reduced causing less permeability reduction as the polymer solution is displaced through the formation rock. This results in higher injectivity rates and more economical recovery of hydrocarbon from the formation.

DESCRIPTION OF THE DRAWING

FIG. 1 relates the effect of water hardness upon the screen factor of an aqueous polymer solution (data taken from Table III). Screen factor is a measure of the flow of a given volume of polymer solution through a porous media and is defined as the ratio of polymer solution flow time to solvent (water) flow time. A correlation exists within a given polymer solution between the solution's screen factor and its resistance factor since the screen factor is highly sensitive to changes in the molecular structure of the polymer. An inverse relationship exists between the degree of hardness (measured as mg/l calcium carbonate) and the screen factor of the aqueous polymer solution.

DESCRIPTION OF THE PREFERRED EMBODIMENTS

Examples of mobility reducing agents useful with the invention include any high molecular weight, salt-sensitive polymer which increases the viscosity of the flooding medium and/or reduces the permeability of the formation to the flow of aqueous solutions and which exhibits "shrinking" of the polymer molecule when exposed to large concentrations of $Ca^{++}$ and/or $Mg^{++}$. Particularly useful examples include high molecular weight polyacrylamides having 10–70% of the amide groups hydrolyzed to carboxy groups and which have an average molecular weight of about 500,000 to about 50,000,000 or more, preferably above about 1,000,000, and more preferably above about 2,500,000. Examples of such polymers include the "Pusher" series of polymers sold by Dow Chemical Co., Midland Mich., U.S.A. Also useful are the copolymers of acrylamide and acrylic acid or sodium acrylate. Polymers useful with this invention generally have molecular weights of about 5,000,000 to about 25,000,000. Improved mobility control can occur from a reduction in permeability by entrapment and/or sorption of the polymer molecules within the formation rock and/or by increasing the viscosity of the injected fluid. High molecular weight polymer molecules become distended in fresh water to such an extent that they may block many flow channels within the formation. By increasing the total hardness of the aqueous polymer solution, the distended polymer molecules shrink or recoil to much smaller dimensions. These tightly coiled polymer molecules are less susceptible to entrapment.

Total hardness within the aqueous polymer solution is defined as the equivalent molecular amount of calcium and/or magnesium converted to calcium carbonate. Total hardness can be increased by adding $Ca^{++}$ and/or $Mg^{++}$ salts to the water. Generally, about 10 to about 15,000 or more mg/l of divalent cation and preferably about 100 to about 10,000 mg/l is useful to shrink the polymer molecules. As can be seen in FIG. 1, increasing the total hardness of an aqueous polyacrylamide solution has an inverse effect upon the solution's screen factor. In practice, the predicted permeability reduction of a reservoir core is directly proportional to the aqueous polymer solution screen factor.

The present invention is particularly useful in waterflooding operations in formations which heretofore have been "plugged" with or by high molecular weight salt sensitive polymers.

It is contemplated that the preferred level of total hardness to be incorporated into the aqueous polymer solution is designed with regard to the average pore size of the formation rock to be flooded. In some circumstances, e.g., in formation rocks containing very large pores, it may be preferred to incorporate no additional hardness within the polymer solution. Use of the present invention is preferred with formations having a medium pore diameter of about 12 microns or less, more preferably less than about 9 microns and most preferably less than about 6 microns; medium pore diameter is defined as that diameter wherein 50% of the total porosity have pores larger than the specified diameter and 50% have pores less than the specified diameter.

Flooding agents, e.g., miscible agent, miscible-like agent, a hydrocarbon and/or water mixtures containing surfactant(s), cosurfactant(s) (e.g., alcohols, aldehydes, esters, amines, etc.), electrolytes, viscosity-increasing agents, and mixtures thereof or any agent which effectively displaces oil, may be injected previous to the injection of the aqueous polymer solution. Preferred agents include oil-external and water-external emulsions, and oil-external and water-external micellar dispersions. Use of flooding agents is taught in U.S. Pat. No. 3,254,714 to Gogarty et al.; U.S. Pat. No. 3,376,925 to Coppel; U.S. Pat. No. 3,348,611 and U.S. Pat. No. 3,330,343 to Reisberg; U.S. Pat. No. 3,354,953 to Morse; U.S. Pat. No. 3,373,809 and U.S. Pat. No. 3,446,282 to Cook, Jr. et al., etc.

EXAMPLES

The following examples are not intended to limit the invention. All equivalents obvious to those skilled in the art are intended to be included within the scope of the invention as defined in the specification and appended claims.

EXAMPLE I

Sandstone cores taken from an Illinois reservoir are cleaned and dried. Initial permeabilities to water are shown in Table I. The cores are flooded at constant rate with about 11 pore volumes of water containing 700 ppm Pusher 700 series polymer (intrinsic viscosity = 15.1 dl/g). The water in core flood No. 1 contains 58 mg/l total hardness, the water in core flood No. 2 contains zero hardness (the water used for core flood No. 1 is treated with a zeolite ion exchange resin to obtain the water for core flood No. 2). The "flushed" permeabilities to water after completion of polymer injection and permanent permeability reductions are shown in Table I.

TABLE I

EFFECT OF WATER HARDNESS ON PERMEABILITY REDUCTION BY POLYMER SOLUTIONS

|  | Water Hardness (mg/l) | Initial Permeability (md) | Flushed Permeability (md) | Permeability Reduction |
|---|---|---|---|---|
| Core Flood No. 1 | 58 | 167 | 21 | 8 |
| Core Flood No. 2 | 0 | 167 | 14 | 12 |

Table I data shows that increasing the total hardness of the solution decreases the permeability reduction. This phenomenon may be utilized to design a polymer solution to be particularly suitable for a specific hydrocarbon-bearing formation and to thereby obtain improved hydrocarbon production from the formation.

EXAMPLE II

Similar to Example I, except 700 ppm of a higher molecular weight copolymer of acrylamide and sodium acrylate having an intrinsic viscosity of 22 dl/g is used. Flooding results are indicated in Table II.

TABLE II

EFFECT OF WATER HARDNESS ON PERMEABILITY REDUCTION BY POLYMER SOLUTIONS

| Water Hardness (mg/l) | Initial Permeability (md) | Flushed Permeability (md) | Permeability Reduction |
|---|---|---|---|
| 42 | 145 | 2.6 | 56 |
| 420 | 154 | 5.2 | 30 |

By inspecting Table II, it is again readily apparent that permeability reduction is decreased by increasing the hardness of the aqueous polymer solution.

EXAMPLE III

Increasing the total hardness of an aqueous polymer solution also decreases the solution's screen factor. The effect of hardness on the screen factor of a 500 ppm Pusher 700 series polymer solution is shown in Table III:

TABLE III

EFFECT OF WATER HARDNESS ON SCREEN FACTOR OF POLYMER SOLUTIONS

| Hardness (as Calcium Carbonate) (mg/l) | Screen Factor |
|---|---|
| 0 | 35 |
| 36 | 24.4 |
| 72 | 21.6 |
| 144 | 18.1 |
| 288 | 17.7 |

For a single aqueous polymer solution, the screen factor is directly relatable to the permeability reduction achieved by injection of the polymer solution.

What is claimed is:

1. In a process of recovering hydrocarbon from a hydrocarbon-bearing subterranean formation wherein an aqueous polymer solution containing a salt-sensitive polymer is injected into the formation and displaced toward a production means in fluid communication with the formation to recover hydrocarbon therethrough and wherein the average molecule of the polymer is of sufficiently large physical size to effect a substantial reduction of the formation rock permeability and wherein the physical size of the molecule is reduced when contacted with an aqueous solution containing large concentrations of $Ca^{++}$ and/or $Mg^{++}$, the improved process comprising increasing the total hardness of the water within the polymer solution to reduce the physical size of the polymer molecules, the result being to cause less permeability reduction of the formation rock as the polymer solution is displaced toward the production well and to permit higher injection rates.

2. The process of claim 1 wherein the salt sensitive polymer is a partially hydrolyzed high molecular weight polyacrylamide.

3. The process of claim 1 wherein the total hardness of the water within the aqueous polymer solution is increased by incorporating salts of $Ca^{++}$ and/or $Mg^{++}$ into the polymer solution.

4. The process of claim 1 wherein the increased total hardness of the water within the aqueous polymer solution is obtained by incorporating about 10 to about 15,000 mg/l of $Ca^{++}$ and/or $Mg^{++}$ cation within the solution.

5. The process of claim 1 wherein a miscible or miscible-like flooding agent is injected previous to the injection of the aqueous polymer solution.

6. The process of claim 5 wherein the flooding agent is a micellar dispersion.

7. In a process of recovering hydrocarbon from a hydrocarbon-bearing subterranean formation wherein an aqueous polymer solution is injected into the formation and displaced toward a production means to recover hydrocarbon therethrough and wherein the physical size of the average polymer molecule is large enough to substantially reduce the injectivity index of the injection well and wherein the physical size of the molecule is reduced when contacted with an aqueous solution containing a large concentration of $Ca^{++}$ and/or $Mg^{++}$, the improved process comprising adding sufficient divalent cation to the water of the aqueous polymer solution to sufficiently reduce the physical size of the polymer molecule to permit increased injectivity index and a more efficient hydrocarbon recovery process.

8. The process of claim 7 wherein the salt-sensitive polymer is a partially hydrolyzed, high molecular weight polyacrylamide.

9. The process of claim 7 wherein the total hardness of the water within the aqueous polymer solution is increased by incorporating salts of $Ca^{++}$ and/or $Mg^{++}$ to the solution.

10. The process of claim 7 wherein the average molecular weight of the polymer is about 500,000 to about 50,000,000.

11. The process of claim 7 wherein a miscible or miscible-like flooding agent is injected into the formation previous to the injection of the aqueous polymer solution.

12. The process of claim 11 wherein the agent is a micellar dispersion.

* * * * *